US006921350B2

(12) United States Patent
Mori

(10) Patent No.: US 6,921,350 B2
(45) Date of Patent: Jul. 26, 2005

(54) TOROIDAL CONTINUOUSLY VARIABLE TRANSMISSION

(75) Inventor: Haruhito Mori, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 93 days.

(21) Appl. No.: 10/307,409

(22) Filed: Dec. 2, 2002

(65) Prior Publication Data

US 2003/0104898 A1 Jun. 5, 2003

(30) Foreign Application Priority Data

Dec. 3, 2001 (JP) ........................................ 2001-368416

(51) Int. Cl.$^7$ .............................................. F16H 15/38
(52) U.S. Cl. ........................................ 476/46; 476/40
(58) Field of Search .............................. 476/40, 42, 46

(56) References Cited

U.S. PATENT DOCUMENTS

| 5,951,435 | A | * | 9/1999 | Imanishi et al. .............. 476/46 |
| 6,174,258 | B1 | * | 1/2001 | Imanishi et al. .............. 476/40 |
| 2002/0137592 | A1 | | 9/2002 | Mori | |

FOREIGN PATENT DOCUMENTS

JP 2001-165265 A 6/2001

* cited by examiner

Primary Examiner—William C. Joyce
(74) Attorney, Agent, or Firm—Foley & Lardner LLP

(57) ABSTRACT

A toroidal continuously variable transmission includes an input disk, an output disk facing the input disk, a power roller gripped between the input disk and output disk, a pedestal which supports the power roller free to rotate about a power roller rotation axis, and a trunnion which gyrates about a trunnion gyration axis. The trunnion includes a first plane portion perpendicular to the power roller rotation axis, two second plane portions perpendicular to the first plane portion and facing each other across the power roller rotation axis and two inclined portions between the first plane portion and the second plane portions, respectively. A roller bearing unit, including a cage housing a roller, supports the pedestal on the trunnion so that the pedestal is free to slide in a direction that is perpendicular to both the trunnion gyration axis and power roller rotation axis. Limiting members, that limit the slide amount of the cage of the power roller bearing relative to the trunnion, are provided on the inclined portions. In this way, the projections serve as a rib, which raises the rigidity of the trunnion. Therefore, deformation of the trunnion is reduced even if overload acts on the trunnion via power roller.

8 Claims, 6 Drawing Sheets

TOROIDAL CONTINUOUSLY VARIABLE TRANSMISSION

FIELD OF INVENTION

The present invention relates to a toroidal continuously variable transmission for vehicles.

BACKGROUND OF THE INVENTION

In a continuously variable transmission (hereafter, CVT), a pair of power rollers is gripped between an input disk and an output disk that face each other. The power rollers transmit a torque from the input disk to the output disk by friction. The power rollers are supported by trunnions.

When the trunnions are displaced in a direction of the respective trunnion axes, contact positions of the power rollers and the disks change and a direction of a force exerted by the disks on the power rollers vary. Due to this variation of force, the power rollers rotate together with the trunnions, and as a result, the contact radius of one of the input disk and the output disk increases, while the contact radius of the other disk decreases. The variation of these contact radii causes a variation of a ratio of rotation speeds of the input disk and output disk, i.e., a speed ratio. Thus, the speed ratio of the transmission can be made to vary continuously by displacing the trunnions in the trunion axis direction. The gyration angle about the trunnion axis is referred to as the gyration angle of the power roller, and corresponds directly to the speed ratio of the CVT.

When the power rollers are gripped between the input disk and the output disk, the input disk and the output disk respectively deform in an overturn direction. In order for the power rollers to follow the deformation in this overturn direction and maintain contact with both disks, they must follow the deformation of the overturn direction and must displace in the direction perpendicular to the trunnion axis and a power roller rotation axis.

In this regard, JP-A-2001-165265 published by the Japanese Patent Office in 2001, discloses power rollers free to slide in the direction perpendicular to the trunnion axis via a roller bearing unit comprising plural needle rollers and a cage which houses the plural needle rollers. The bearings slide on inclined portions of a trunnion. Projections are respectively provided at ends of the power roller cavity of the trunnion, and depressions into which the projections fit are respectively formed on each side of the cage. By providing the projections, the slide amount of the cage relative to the trunnion is limited to a gap between the cage and the projections in neutral position.

However, in the construction disclosed in JP-A-2001-165265, the roller bearing unit can be displaced in any direction of the power roller cavity, so rigidity of the inclined portions is lacking. If thrust force overdrives the trunnion, the trunnion deforms in a direction of the thrust force.

In addition, if the trunnion undergoes a large deformation, a relative position between the power roller and the disks is shifted. This causes a variation of a ratio of rotation speeds of the input disk and output disk, which is not what is intended.

BRIEF DESCRIPTION OF THE INVENTION

In one aspect of this invention the projections are arranged so that the roller bearings do not protrude from the trunnion, and to prevent the deformation of the trunnion when the thrust force overdrives the trunnion.

In one aspect, the present invention provides a toroidal continuously variable transmission comprising an input disk, an output disk facing the input disk, a power roller gripped between the input disk and output disk, a pedestal which supports the power roller free to rotate about a power roller rotation axis, a trunnion which gyrates about a trunnion gyration axis and comprises a first plane portion perpendicular to the power roller rotation axis, two second plane portions perpendicular to the plane portion and facing each other across the power roller rotation axis, two inclined portions between the first plane portion and the second plane portions respectively, a roller bearing which comprises a cage housing a roller and supports the pedestal on the trunnion so that the pedestal is free to slide in a direction perpendicular to both the trunnion gyration axis and power roller rotation axis. Limiting members, which limit the slide amount of the cage of the power roller bearing relative to the trunnion, are provided on the inclined portions.

The details as well as other features and advantages of the invention are set forth in the remainder of the specification and are shown in the accompanying drawings.

DESCRIPTION OF THE PREFERRED EMBODIMENTS

Figure 1:
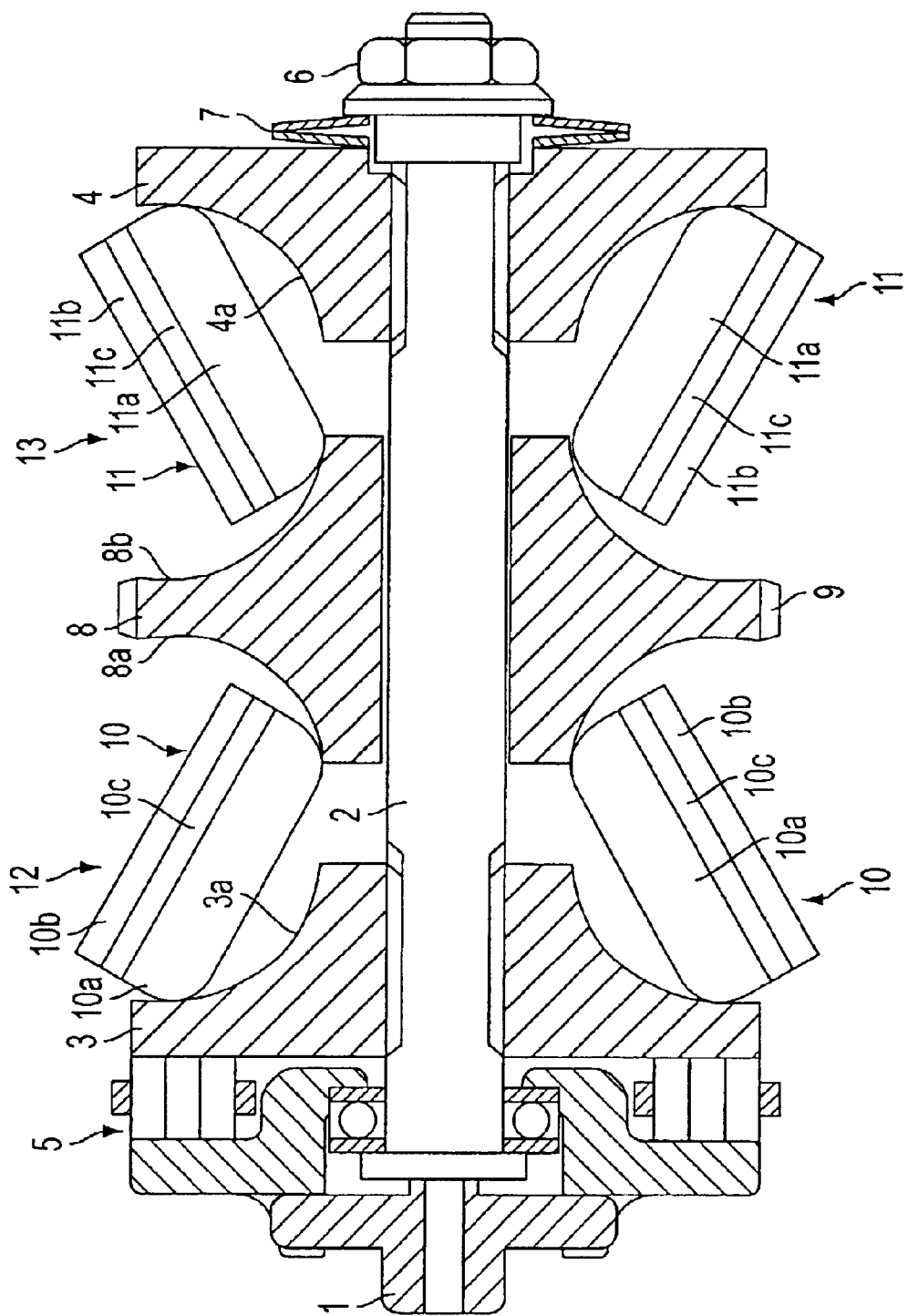
FIG. 1 is an overall schematic view of the toroidal continuously variable transmission (CVT) relating to this invention.

Referring to FIG. 1 of the drawing, an input shaft 1 is connected with a forward and reverse changeover device, not shown. The forward and reverse changeover device is connected with a torque transmission shaft 2. A first speed change mechanism 12, and a second speed change mechanism 13, is arranged inside a transmission case.

The first speed change mechanism 12 is provided with an input disk 3 and an output disk 8a whereof the opposite faces are formed as toroidal curved surfaces. A pair of power rollers 10, 10 gripped between the input 3 and the output disk 8a are arranged symmetrically on either side of the torque transmission shaft 2. The first speed change mechanism 12 comprises trunnions 14, 14 which respectively support the power rollers 10, 10, and servo pistons 16a, 16a, as shown FIG. 2.

The second speed change mechanism 13 is likewise provided with an input disk 4 and an output disk 8b, a pair of power rollers 11, 11, trunnions 14, 14 and servo pistons 16a, 16a.

The speed change mechanisms 12, 13 are arranged on the torque transmission shaft 2. The input disk 3 of the first speed change mechanism 12 is pushed by a loading mechanism 5 which generate a thrust force according to the input torque.

The loading mechanism 5 is supported by the torque transmission shaft 2 via a bearing. The input disk 4 of the second speed change mechanism 13 is pushed by a belleville spring 7. The input disks 3, 4 are supported by the transmission shaft 2 via ball splines.

An integrated output disk 8 has portions that comprise the output disk 8a and the output disk 8b. Back plates of the output disk 8a, 8b are united with each other. An output gear 9 is provided around the output disk 8. The torque transmitted to the output disk 8 is transmitted to a propeller shaft, not shown.

The power roller 10, 10, 11, 11 respectively gyrate to realize gyration angles corresponding to a target speed ratio, and the input rotation of the input disks 3, 4 is continuously varied and transmitted to the output disk 8.

Figure 2:
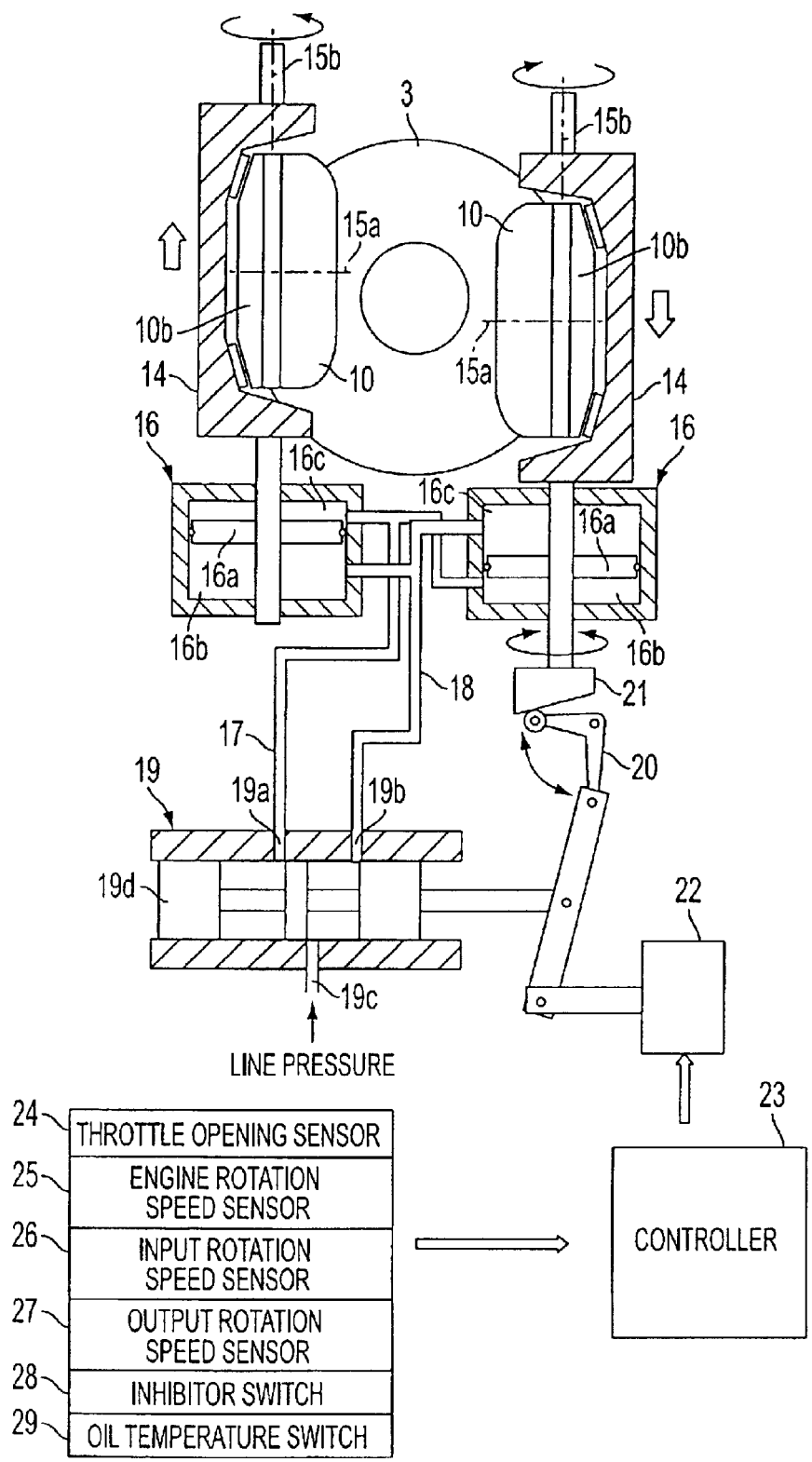
FIG. 2 shows the speed control system of the CVT.

Next, the speed control system of the CVT will be described referring to FIG. 2.

The speed control system causes the trunnions to respectively gyrate so that the gyration angle corresponding to a target speed ratio may be obtained.

The power rollers 10, 10 are supported on pedestals 10b, 10b such that they are free to rotate about power roller rotation axes 15a, 15a and the pedestals are supported by trunnions 14, 14 such that they are free to slide toward the input or output disks. Servo pistons 16a, 16a which displace the trunnions 14, 14 in their shaft direction and cause the power roller 10, 10 to gyrate are provided at the lower ends of the trunnions 14, 14.

An oil passage 17 connected to a high oil chamber 16b, an oil passage 18 connected to a low oil chamber 16c, and a speed ratio control valve 19 comprising a port 19a connecting the oil passage 17 and a port 19b connecting the oil passage 18, are provided as an oil pressure control system which controls the servo pistons 16a, 16a. A line pressure from an oil pressure source comprising an oil pump and a relief valve, not shown, is supplied to a line pressure port 19c of the speed ratio control valve 19. The spool 19d of the speed ratio control valve 19 cooperates with a lever 20 and cam 21 which feed back the axial displacement and gyration angle of the trunnion 14 to the speed ratio control valve 19, and is driven by a step motor 22.

A CVT controller 23 controls the step motor 22. Signals from a throttle opening sensor 24, engine rotation speed sensor 25, input rotation speed sensor 26, output rotation speed sensor 27, inhibitor switch 28 and oil temperature switch 29 are input to the CVT controller 23.

Figure 3:
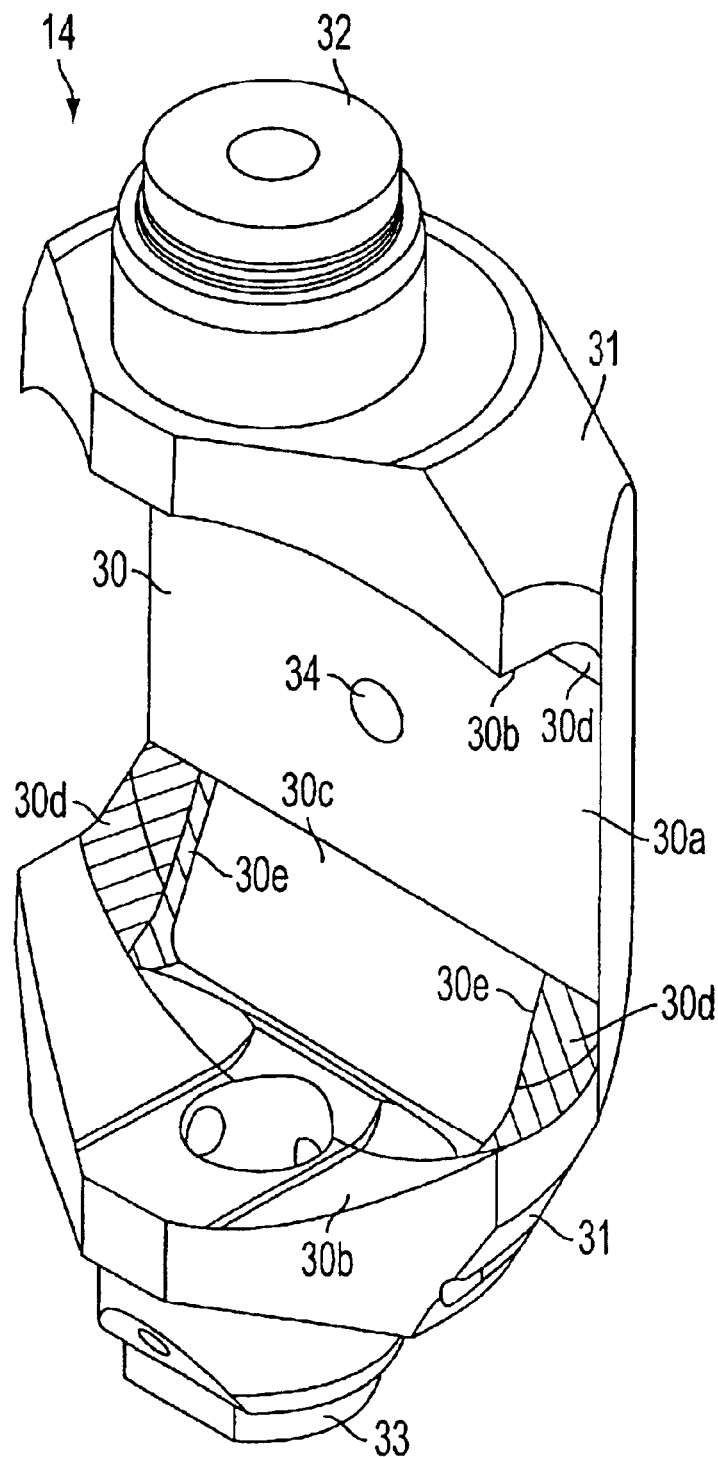
FIG. 3 is perspective view of a trunnion.
Figure 4:
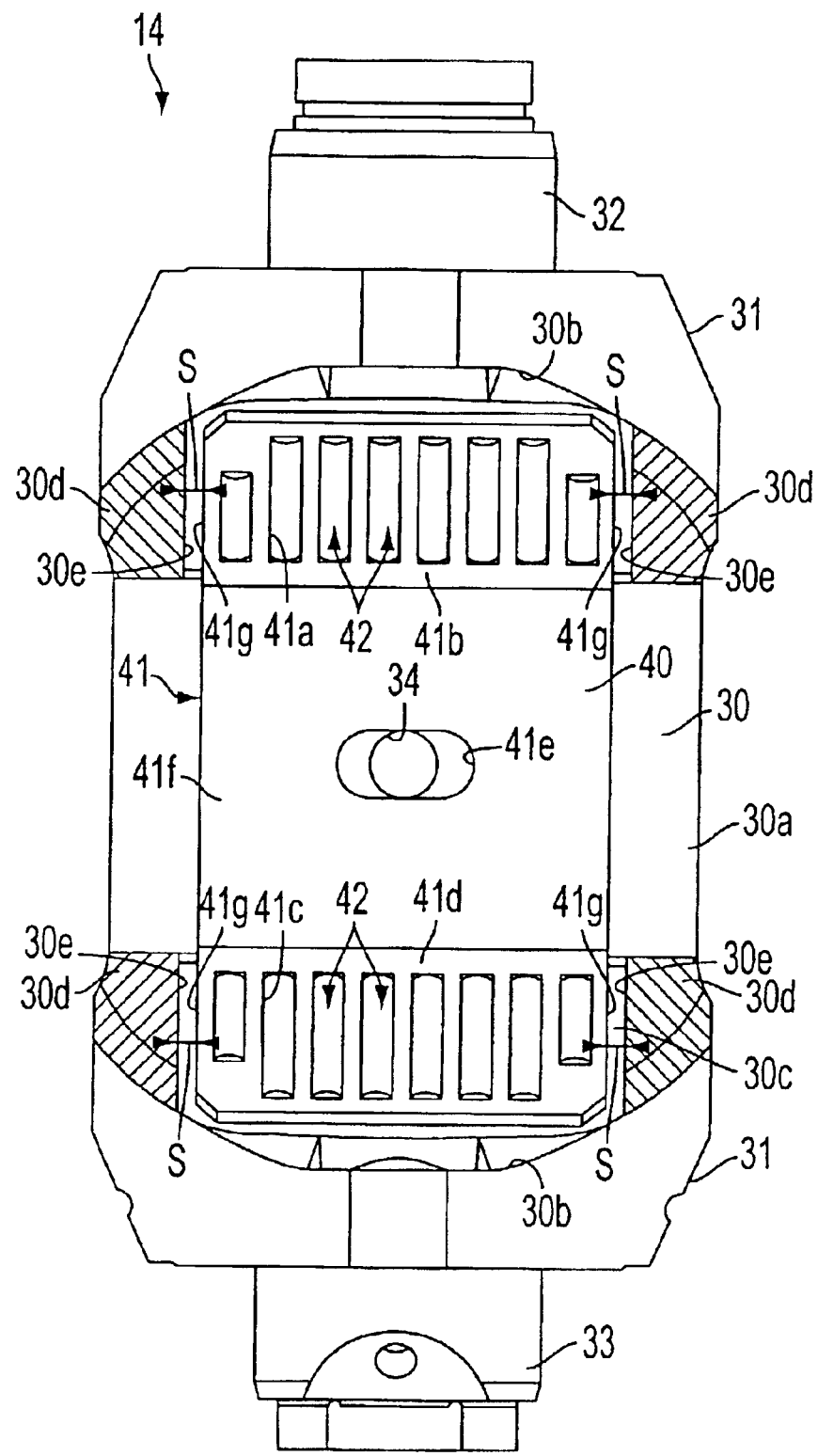
FIG. 4 is a front elevation of the trunnion with roller bearings.

FIG. 3 is perspective view of a trunnion 14 of a first embodiment of this invention. FIG. 4 is front view of a trunnion 14 of the first embodiment of this invention.

A power roller cavity 30, skewed portions 31, 31, an upper gyration axis 32, a lower gyration axis 33, and an oil passage 34 are formed in the trunnion 14, as shown in FIG. 3. The pedestal 10b for the power roller 10 is supported in the power roller cavity 30 via a roller bearing unit 40. The pedestal 10b is free to slide in the direction perpendicular to both the trunnion gyration axis and power roller rotation axis.

The roller bearing unit 40 comprise plural needle rollers 42 supported free to rotate in upper pockets 41a formed in the inclined upper part 41b of the cage 41 and lower pockets 41c formed in the inclined lower part 41d of the cage 41, and a plate 41f connecting the inclined upper part 41b and the inclined lower part 41d. An oil passage 41e is formed in the plate 41f.

A plane portion 30a perpendicular to the power roller rotation axis 15a, plane portions 30b, 30b perpendicular to the plane portion 30a and facing each other across the power roller rotation axis 15a, inclined portions 30c, 30c between the plane portion 30a and the plane portion 30b, and projections 30d, 30d, shown as a hatch pattern, respectively provided at the end of the inclined portions 30c, 30c are formed in the power roller cavity 30. The projections 30d, 30d are formed in positions where the projections 30d do not interfere with the power roller 10.

End faces 41g, 41g, formed respectively on each side of the cage 41, engage against the stopper faces 30e, 30e, formed in the projections 30d, 30d, to thereby limit the movement of the bearing unit 40. By providing the projections 30d, the slide amount of the cage 41 relative to the trunnion 14 is limited to a gap S, S between the cage 41 and the projections 30d, 30d in the neutral position.

The CVT varies the speed ratio by causing the power rollers 10, 10, 11, 11 to gyrate. That is, if the spool 19d displaces due to the step motor 22 rotating, oil supply to the servo piston chambers of the servo pistons 16, 16, 16, 16 is controlled, the rotation centers of the power rollers 10, 10, 11, 11 will be offset relative to the rotation centers of the disks 3, 4, 8. Due to the offset, a gyration force acts on the power rollers 10, 10, 11, 11, and their gyration angles vary. The gyration angle and offset amount are transmitted to the spool 19d via the cam 21 and lever 20, and the power rollers come to rest in a position where they balance the spool 19d which displaces due to the step motor 22. The step motor 22 displaces the spool 19d by a command from the CVT controller 23 according to the target speed ratio.

Therefore, when a force in the direction of the trunnion gyration axis acts on the power roller 10, this load is supported by the roller bearing unit 40, and when a load acts on the power roller 10 in the direction perpendicular to the trunnion gyration axis 15b and power roller rotation axis 15a, the pedestal 10b slides in the direction while the needle rollers 42 of the roller bearing unit 40 turn. In other words, even if a force acts on the power roller 10 in the direction of the trunnion gyration axis, the power roller 10 can displace smoothly in the direction perpendicular to the trunnion gyration axis 15b and power roller rotation axis 15a.

Hence, if the input and output disks deform or are imprecisely assembled, the power roller 10 can still slide smoothly in the direction perpendicular to the trunnion gyration axis 15b and power roller rotation axis 15a to absorb these positional deviations, and the thrust force acting on the power roller 10 from the input disks 3 is maintained equal to the thrust force acting on the power roller 10 from the output disk 8.

As mentioned above, when a deformation or assembly error of the input and output disks 3, 4, 8 occurs, in order to absorb these positional deviations, the power roller 10 slides in the direction perpendicular to the trunnion gyration axis and power roller rotation axis. When the power roller 10 slides repeatedly in the direction perpendicular to the trunnion gyration axis and power roller rotation axis, the force which acts on the cage 41 of the roller bearing unit 40 interposed between the pedestal 10b and the power roller cavity 30, is different when the power roller 10 is pushed and the cage 41 slides, and when the force on the power roller 10 is released and the cage 41 returns, so the cage 41 tends to protrude from the trunnion 14.

However, as the projections 30d, 30d which limit the slide amount of the cage 41 relative to the trunnion 14 in the direction perpendicular to the trunnion gyration axis 15b and power roller rotation axis 15a are provided between the cage 41 and trunnion 14, the cage 41 does not protrude or fall out from the trunnion 14, and the support of the load acting on the power roller 10 is maintained at a sufficient level.

As opposed to this, as the projections 30d, 30d are formed at the end of the inclined portions 30c, 30c of the power roller cavities 30, and the projections 30d, 30d serve as a rib, which raises the rigidity of the trunnion 14. Therefore, deformation of the trunnion 14 is reduced even if overload acts on the trunnion 14 via power roller 10, 11. Thus the deformation of the trunnion 14 is reduced, so the variation of the ratio of rotation speeds of the input disk and output disk is reduced.

Furthermore, the projections 30d, 30d stick out at both ends of the inclined portions 30c, 30c, so the slide amount of the cage 41 relative to the trunnion 14 is limited to a gap S, S between the cage 41 and the projections 30d, 30d in the neutral position. In other words, the projections 30d, 30d function as stoppers so that the cage 41 does not protrude or fall out from the trunnion 14.

A second embodiment will now be described.

In this embodiment, in addition to the effects of the first embodiment, the following additional effect can be obtained.

The roller bearing unit 40 is divided into two roller bearings. One is the upper roller bearing 40a and the other is the lower roller bearing 40b. The upper and lower roller bearings 40a, 40c are placed in the inclined portions 30c, 30c of the power roller cavity 30.

Figure 5A:
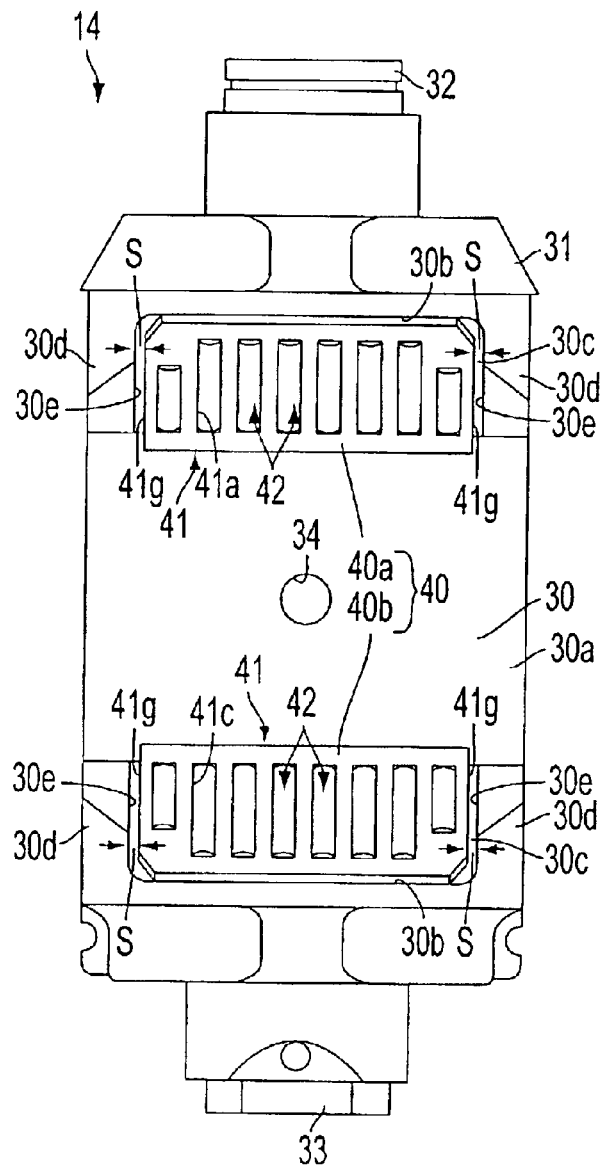
FIG. 5(a) is a front elevation of the trunnion with roller bearings and FIG. 5(b) is a side elevation of the trunnion with roller bearings, according to a second embodiment of this invention.
Figure 5B:
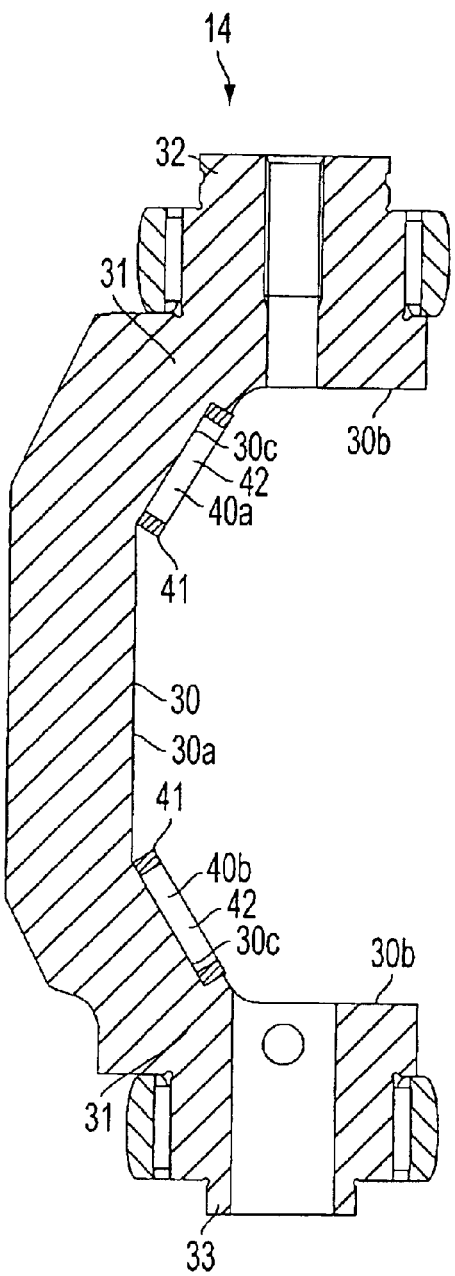

Basic structures of the second embodiment are identical to those of the first embodiment. The upper roller bearing 40a comprises plural needle rollers 42 supported free to rotate in pockets 41a of the cage 41 and is provided two end faces 41g, 41g which abut against the stopper faces 30e, 30e formed in the projections 30d, 30d. And the lower roller bearing 40b comprises plural needle rollers 42 supported free to rotate in pockets 41c of the cage 41 and is provided two end faces 41g, 41g which abut against the stopper faces 30e, 30e formed in the projections 30d, 30d, as shown FIGS. 5(a) and 5(b).

The remaining features are similar to those of the first embodiment, so the same symbols are assigned to them and description is omitted. The operation of this embodiment is similar to that of the first embodiment, so description is omitted.

Therefore, in this embodiment, in addition to the effect of the first embodiment, the roller bearing unit 40 is divided into the upper roller bearing 40a and the lower roller bearing 40b, so it is unnecessary to process it with sufficient accuracy to prevent that upper and lower roller bearings 40a, 40b do not interfere with other circumference parts, and costs can be reduced to produce the roller bearings.

Moreover, comparing with the first embodiment, it is unnecessary to provide the plate 41f connecting the inclined upper part 41b and the inclined lower part 41d in second embodiment, so the oil passage 41e is unnecessary.

A third embodiment will now be described.

In this embodiment, the upper roller bearing 40a and the lower roller bearing 40b are disposed in concave portions 30f, 30f formed in the inclined portion 30c, 30c of the power roller cavity 30.

Basic structures of the third embodiment are identical to those of the first embodiment, and the upper roller bearing 40a and the lower roller bearing 40b are the same as in the second embodiment.

Figure 6A:
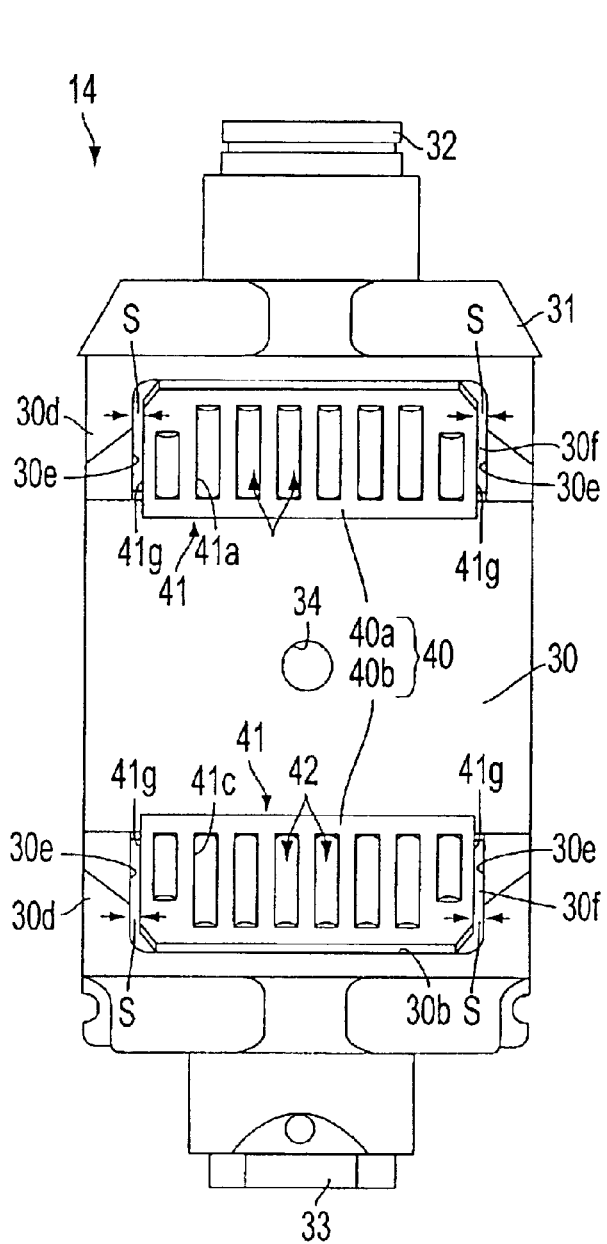
FIG. 6(a) and FIG. 6(b) are similar to FIG. 5(a) and FIG. 5(b), but show a third embodiment of the present invention.
Figure 6B:
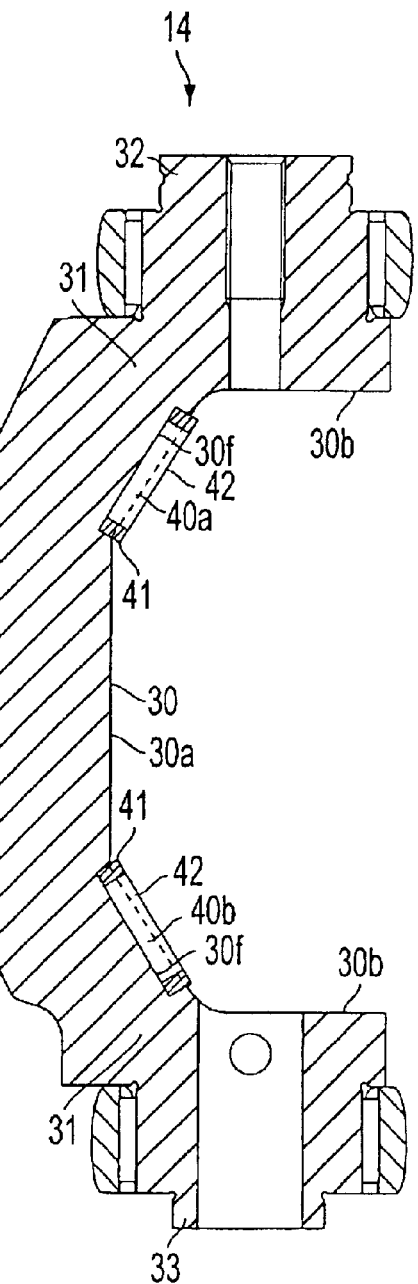

The concave portions 30f, 30f that hold the upper roller bearing 40a and the lower roller bearing 40b are formed in the inclined portion 30c, 30c of the power roller cavity 30, as shown FIG. 6.

The remaining features of the construction are identical to those of the second embodiment, so the same symbols are assigned to them and description is omitted. The operation of this embodiment is similar to that of the first embodiment, so description is omitted.

Therefore, in this embodiment, in addition to the effect of the first and second embodiments, the upper roller bearing 40a and the lower roller bearing 40c is disposed in concave portions 30f, 30f formed in the inclined portion 30c, 30c of the power roller cavity 30. Therefore, the upper roller bearing 40a and the lower roller bearing 40b do not cause a deviation for the direction of the trunnion gyration axis or the input and the output disks rotation axis from the desired positions.

The contents of Japanese Patent Application No. 2001-368416 filed on Dec. 3, 2001 are incorporated herein in its entirety.

Other embodiments of the invention will be apparent to those skilled in the art from a consideration of the specification and the practice of the invention disclosed herein. It is intended that the specification be considered as exemplary only, with the true scope and spirit of the invention also being indicated by the following claims.

What is claimed is:

1. A toroidal continuously variable transmission comprising:

an input disk;

an output disk facing the input disk;

a power roller gripped between the input disk and output disk;

a pedestal which supports the power roller free to rotate about a power roller rotation axis;

a trunnion which gyrates about a trunnion gyration axis and comprises a first plane portion perpendicular to the power roller rotation axis, two second plane portions perpendicular to the first plane portion and facing each other across the power roller rotation axis, and two inclined portions between the first plane portion and the second plane portions, respectively;

a roller bearing unit, comprising a cage housing a roller, that supports the pedestal on the trunnion so that the pedestal is free to slide in a direction that is perpendicular to both the trunnion gyration axis and power roller rotation axis; and limiting members, which limit the slide amount of the cage of the power roller bearing relative to the trunnion, are provided on the inclined portions.

2. A toroidal continuously variable transmission as defined in claim 1, wherein the roller bearing unit comprises an upper roller bearing and a lower roller bearing that are placed in the inclined portions of the power roller cavity, respectively.

3. A toroidal continuously variable transmission as defined in claim 2, wherein the upper roller bearing and the lower roller bearing are arranged in concave portions formed in the respective inclined portions of the power roller cavity.

4. A toroidal continuously variable transmission as defined in claim 1, wherein the limiting members comprise projections extending out at the both ends of the inclined portions.

5. A toroidal continuously variable transmission as defined in claim 4, wherein the projections comprise stopper faces to limit the movement of the bearing unit.

6. A toroidal continuously variable transmission as defined in claim 5, wherein the cage comprises end faces that face the stopper faces, respectively.

7. A toroidal continuously variable transmission as defined in claim 6, wherein the respective end faces and stopper faces are separated from each other by a gap when the trunnion is in a neutral position.

8. A toroidal continuously variable transmission as defined in claim 1, wherein the limiting members designed as ribs that provide additional rigidity to the trunnion.

* * * * *